United States Patent
Ishimaru et al.

(10) Patent No.: US 8,292,353 B2
(45) Date of Patent: Oct. 23, 2012

(54) CONSTRUCTION FOR AN AUTOMOTIVE VEHICLE

(75) Inventors: Toro Ishimaru, Miyoshi-Cho (JP); Jonathan R. Young, Dundee, MI (US); Robert D. Smith, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 205 days.

(21) Appl. No.: 12/628,599

(22) Filed: Dec. 1, 2009

(65) Prior Publication Data

US 2011/0127800 A1 Jun. 2, 2011

(51) Int. Cl.
*B60J 7/00* (2006.01)
(52) U.S. Cl. .......... 296/193.06; 296/187.01; 296/187.12
(58) Field of Classification Search ............. 296/196.06, 296/203.03, 209, 187.11, 187.12, 204, 146.6, 296/190.8, 29, 193.06, 187.01; *B60J 5/00; B62D 25/04*
See application file for complete search history.

(56) References Cited

U.S. PATENT DOCUMENTS

| | | | | |
|---|---|---|---|---|
| 3,883,171 A * | 5/1975 | Bauer | ...................... | 296/187.12 |
| 5,820,204 A * | 10/1998 | Masuda et al. | ........... | 296/187.12 |
| 6,299,238 B1 * | 10/2001 | Takagi et al. | ............ | 296/187.12 |
| 6,988,763 B2 * | 1/2006 | Saeki | ........................ | 296/187.12 |
| 7,264,302 B2 * | 9/2007 | Nagashima | ............... | 296/187.12 |
| 7,594,691 B2 * | 9/2009 | Koormann et al. | ...... | 296/187.12 |
| 7,976,098 B2 * | 7/2011 | Nishimura et al. | ...... | 296/193.06 |
| 2007/0152474 A1 * | 7/2007 | Lassl et al. | ............... | 296/187.12 |
| 2008/0238144 A1 * | 10/2008 | Kamimae | ................ | 296/190.08 |
| 2009/0146457 A1 * | 6/2009 | Kanagai et al. | .......... | 296/187.12 |
| 2009/0243343 A1 * | 10/2009 | Tamakoshi | .................... | 296/204 |
| 2010/0231003 A1 * | 9/2010 | Okumura et al. | ........ | 296/193.06 |

FOREIGN PATENT DOCUMENTS

| | | |
|---|---|---|
| JP | 2008037238 A | 2/2008 |
| JP | 2008189137 A | 8/2008 |
| JP | 2009006748 A | 1/2009 |
| JP | 2009073420 A | 4/2009 |
| JP | 2009137467 A | 6/2009 |

* cited by examiner

*Primary Examiner* — Glenn Dayoan
*Assistant Examiner* — Pinel Romain
(74) *Attorney, Agent, or Firm* — Gifford, Krass, Sprinkle, Anderson & Citkowski, P.C.

(57) ABSTRACT

A construction for an automotive vehicle having a generally vertically extending pillar positioned adjacent a door opening as well as a laterally extending cross member having one end aligned with the pillar adjacent its bottom. A gusset has one end secured to one end of the cross member and a second end secured to the pillar. A crush box is attached to the pillar and includes at least a portion aligned with the second end of the gusset to provide a controlled pillar deformation resulting in a constant force-deformation loading of the gusset during a side impact.

9 Claims, 4 Drawing Sheets

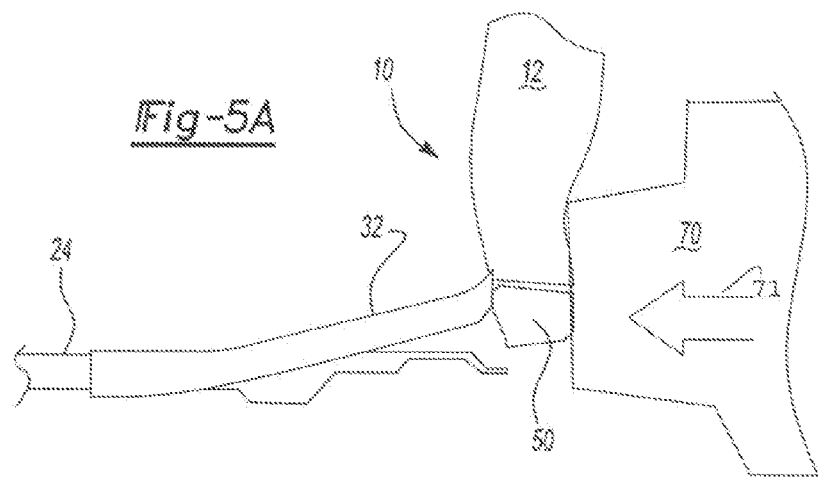
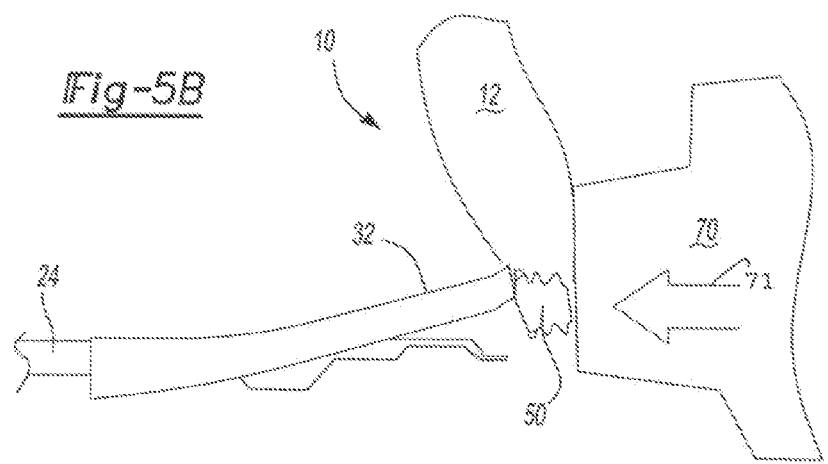
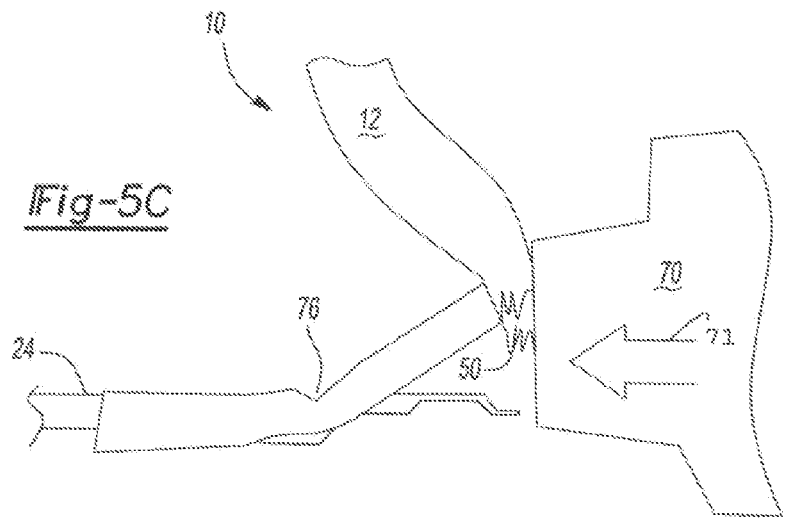

CONSTRUCTION FOR AN AUTOMOTIVE VEHICLE

BACKGROUND OF THE INVENTION

1. Field of the Invention

The present invention relates generally to a construction for an automobile and, more particularly, to such a construction with improved performance during a side impact.

2. Description of Related Art

Automotive vehicles, such as SUVs, have an automotive body with a plurality of cross members extending laterally across the vehicle beneath the passenger compartment. In addition, vertically extending pillars extend along the sides of the vehicle door openings. These pillars, furthermore, are typically aligned with and attached to one of the laterally extending cross members.

In the event of a side impact against the vehicle, the side impact, if of sufficient energy, crushes the pillar and intrudes into the passenger compartment. Such inward movement of the pillar into the passenger compartment is undesirable. Therefore, it is desirable to minimize the inward movement of the pillar during such a side impact.

In order to reduce the inward movement of the pillar during a side impact, it has been previously known to provide a gusset having a first end secured to the cross member and a second end secured to the pillar. Ideally, during a side impact, the gusset provides additional support against inward deformation of the pillar as well as any panels, such as the door, secured to the pillar.

These previously known gussets, however, have not proven wholly satisfactory in use. Specifically, since the pillar is typically constructed of rather thin-walled sheet metal in order to minimize the weight of the pillar, the pillar rapidly crushes during a side impact resulting in a localized intrusion into the passenger compartment. Furthermore, pillar collapse results in a lack of direct load path to the aligned gusset, thus the force of the side impact is not effectively transferred to the gusset which deforms inwardly into the passenger compartment. In such a crash, these previously known gussets ineffectively transfer a sufficient amount of the force of the impact to the cross member of the vehicle.

SUMMARY OF THE PRESENT INVENTION

The present invention provides a construction for an automotive vehicle which overcomes the above-mentioned disadvantages of the previously known constructions.

In brief, the present invention provides a construction for an automotive vehicle having a generally vertically extending pillar adjacent a door opening. A bottom of the pillar is aligned with a laterally extending cross member extending along the bottom of the vehicle underneath the passenger compartment.

A gusset has one end secured to the cross member and a second end attached to the pillar. This gusset, furthermore, preferably includes a reinforcing plate along a portion of its length to provide a controlled and predetermined bend line for the gusset in the event of a side impact on the pillar.

Unlike the previously known vehicle constructions, however, a crush box is attached to the pillar which has at least a portion aligned with the second end of the gusset. In the event of a side impact on the pillar, the crush box will first carry load then crush at a predetermined load thus resisting said pillar collapse and controlling the force distribution of the impact. In the event of a sufficiently high side impact on the vehicle, after the crush box deforms, the energy of the side impact, now reduced by the energy absorbed during the deformation of the crush box, is then transferred to the gusset which in turn deforms along a predetermined bend line.

Consequently, unlike the previously known constructions, the construction of the present invention with the crush box causes the side pillar to undergo a controlled, i.e. constant force times deformation, bending beyond the timing of the peak load of the side impact. This, in turn, reduces the overall inward deformation of the pillar with its attached vehicle components into the passenger compartment.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIGS. 5A-5C are diagrammatic views illustrating the operation of the present invention.

DETAILED DESCRIPTION OF A PREFERRED EMBODIMENT OF THE PRESENT INVENTION

Figure 1:
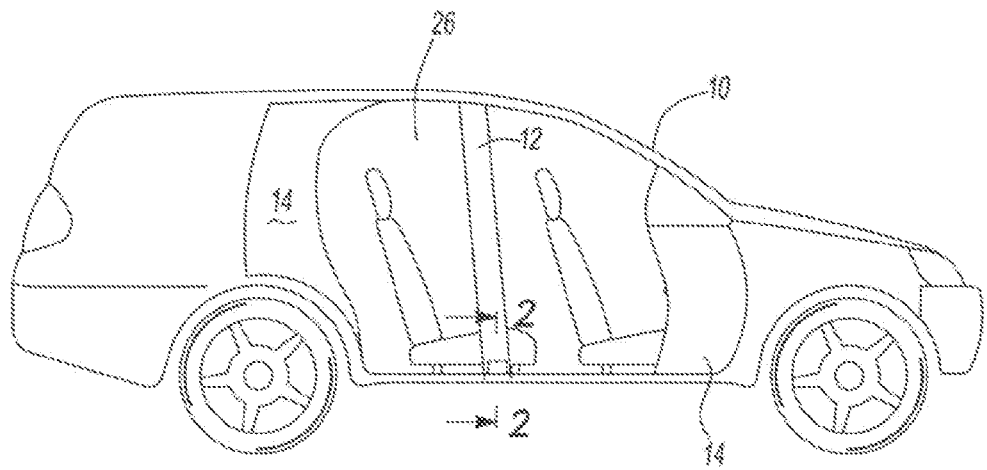
FIG. 1 is a side view of an automotive vehicle.
Figure 2:
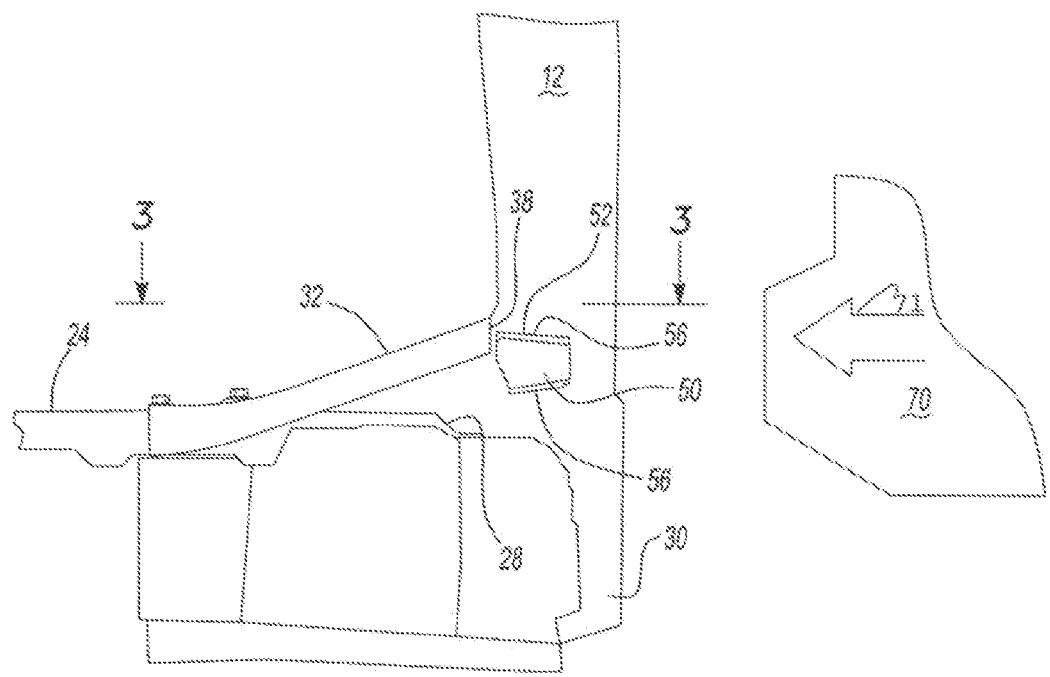
FIG. 2 is a partial sectional view taken substantially along line 2-2 in FIG. 1 and enlarged for clarity.
Figure 3:
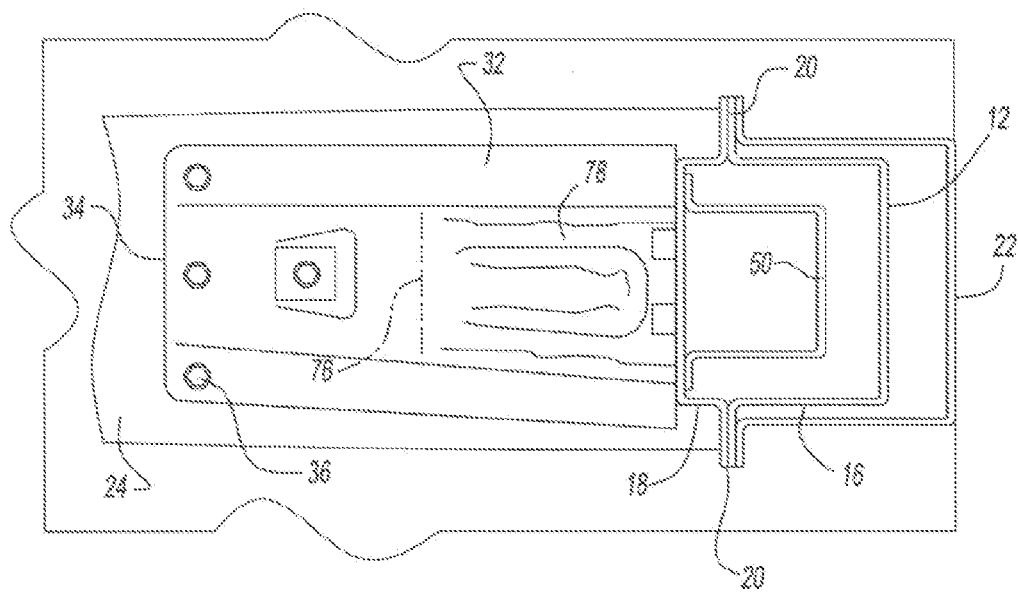
FIG. 3 is a fragmentary view taken substantially along line 3-3 and enlarged for clarity.

With reference first to FIGS. 1-3, an automotive vehicle 10 is shown having a generally vertically extending pillar 12 positioned between two door panels 14 (FIG. 1). As perhaps best shown in FIG. 3, the pillar includes an outer part 16 and an inner part 18. The inner and outer parts 16 and 18 of the pillar 12 are both constructed from sheet metal which is secured together, typically by welding, by outer flanges 20. Consequently, the pillar 12 is generally hollow from its bottom and to its top. An outer decorative panel 22 also extends around the outer part 16 of the pillar 12 for aesthetic purposes.

Referring now particularly to FIGS. 2 and 3, the vehicle also includes a laterally extending cross member 24 which extends laterally across the vehicle under the vehicle passenger compartment 26 (FIG. 1). One end 28 of the cross member 24 is both aligned with and attached to the pillar 12 adjacent its bottom 30.

With reference still to FIGS. 2 and 3, in order to support the pillar 12 in the event of a side impact, a gusset 32 has a first end 34 attached to the cross member 24 by bolts 36 at a position spaced inwardly from the pillar 12. The gusset 32 extends upwardly at an angle and has its outer end 38 secured to the pillar 12 adjacent the bottom 30 of the pillar 12.

Figure 4:
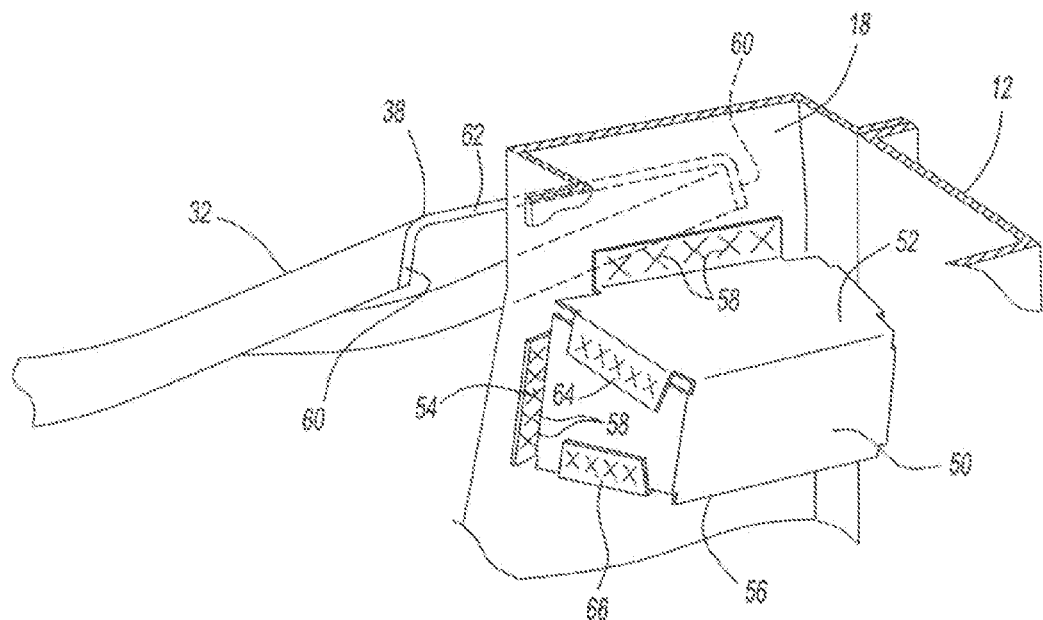
FIG. 4 is a fragmentary elevational view illustrating a portion of the present invention.

With reference now particularly to FIGS. 2-4, in order to increase the overall rigidity of the pillar 12 in the area aligned with the end 38 of the gusset 32, a crush box 50 is positioned within the inside of the pillar 12 and has at least a portion aligned with the end 38 of the gusset 32. The crush box 50 is preferably constructed of sheet metal or high density plastic and, as shown in FIG. 4, includes a top wall 52, side walls 54 (only one shown), outer wall 59, and a bottom wall 56. The side of the crush box 50 facing the interior of the vehicle is preferably open.

Any conventional means, such as welds 58, may be used to secure the crush box 50 to the inner part 18 of the pillar 12.

Other means, however, may alternatively be used to secure the crush box 50 to the pillar 12.

With reference now particularly to FIGS. 2 and 4, the gusset 32 is generally U-shaped having a pair of side walls 60 and a base wall 62. The crush box 50 is then aligned so that its top wall 52 is aligned with the side walls 60 of the gusset 32.

As best shown in FIG. 4, the side walls 54 of the crush box 50 are welded to flaps 64 and 66 attached to the top wall 52 and bottom wall 56, respectively. Consequently, even though the crush box 50 is constructed of sheet metal, it has an overall rigid construction. Furthermore, the crush box 50 is preferably constructed of sheet metal that is thicker than the sheet metal used to construct the pillar 12.

With reference now to FIGS. 5A-5C, in the event of a side crash from a crashing vehicle 70, the crashing vehicle 70 transmits its force in the direction of arrow 71 against the outside of the vehicle 10. Upon impact, the crush box 50 initially prevents the complete deformation of the pillar 12 and, instead, transmits the force to the gusset 32 which, in turn, transmits the force to the cross member 24.

As shown in FIG. 5B, when the force from the crashing vehicle 70 exceeds a predetermined amount, the crush box 50 begins a controlled crush. During this controlled crush, the inward deformation of the pillar 12 is also minimized and the force of the crashing vehicle 70 is still transmitted through the crush box 50 and gusset 32 to the vehicle cross member 24.

In the event that the force from the crashing vehicle 70 exceeds a predetermined threshold, the gusset 32 will begin to bend along a bend line 76. However, at this time the crush box 50 has already absorbed a significant amount of the energy from the crashing vehicle which reduces the inward movement of the pillar 12 and its connected door panels into the passenger compartment versus the inward movement in the absence of the crush box 50.

With reference now to FIG. 3, in order to ensure that the gusset 32 bends along the bend line 76, a reinforcing plate 78 is preferably secured to the gusset 32 by any conventional means, such as welding, so that the reinforcement gusset extends from the bend line 76 and to the pillar 12. The bend line 76, furthermore, is positioned outboard from the attachment of the gusset 32 to the cross member 24.

Figure 6A:
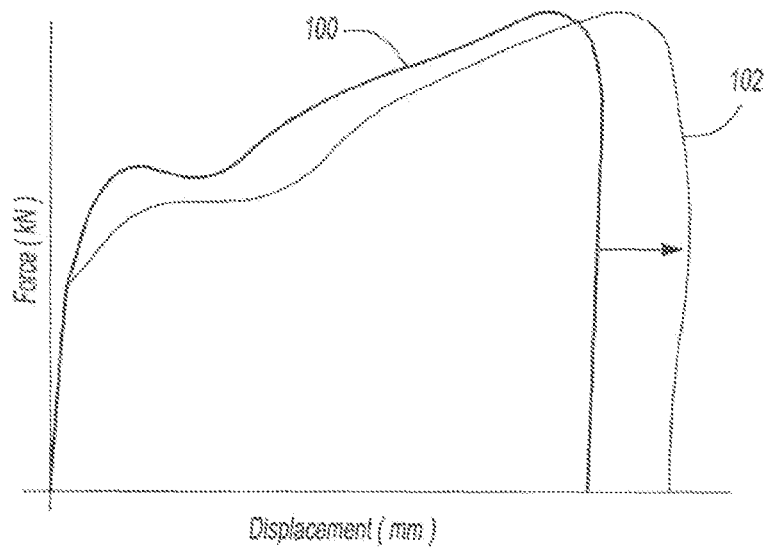
FIGS. 6A and 6B are graphs illustrating the effects of the crush box.

FIG. 6A illustrates the force versus displacement for a vehicle with the crush box 50 at graph 100 and for a vehicle without a crush box 50 at graph 102. As can be seen by the graphs 100 and 102, the crush box reduces the intrusion into the vehicle in the event of a side impact.

Figure 6B:
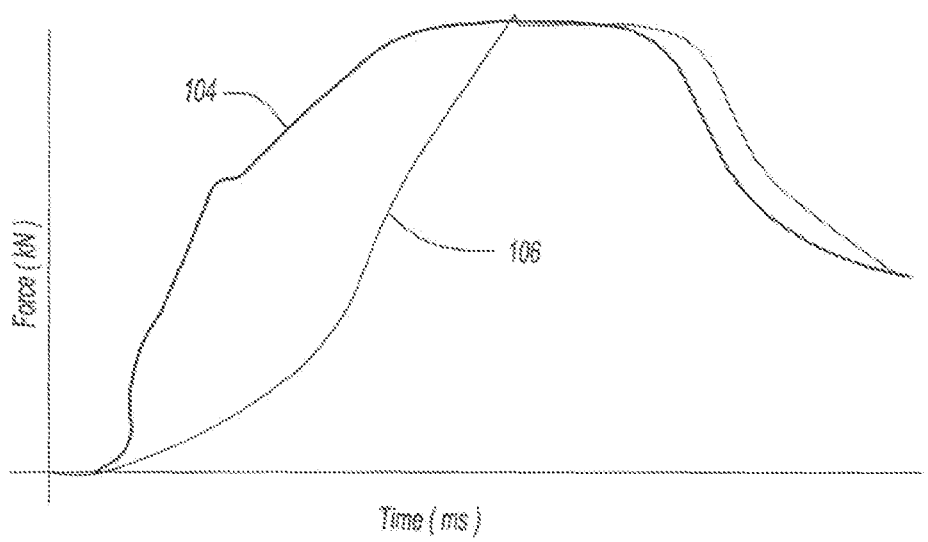

Similarly, FIG. 6B illustrates the axial force versus time through the gusset for a vehicle with the crush box 50 at graph 104 and for a vehicle without a crush box 50 at graph 106. As can be seen by the graphs 104 and 106, the crush box provides a more controlled dissipation of the energy caused by a side impact.

From the foregoing, it can be seen that the present invention provides a simple, yet effective, construction for an automotive body which reduces the inward movement of the vertical pillars between door panels in the event of a side impact. Furthermore, since the crush box 50 reduces this inner movement, the pillar 12 can be made of a lighter weight or thinner construction thus resulting in overall cost and weight improvements.

Having described our invention, however, many modifications thereto will become apparent to those skilled in the art to which it pertains without deviation from the spirit of the invention as defined by the scope of the appended claims.

We claim:

1. A construction for an automotive vehicle comprising:
a generally vertically extending pillar positioned adjacent a door opening, said pillar having a hollow interior,
a laterally extending cross member having one end aligned with said pillar adjacent a bottom of said pillar,
a gusset having one end secured to said one end of said cross member and a second end attached to said pillar,
a crush box attached to said pillar wholly within said hollow interior of said pillar, said crush box having at least a portion aligned with said second end of said gusset.

2. The construction as defined in claim 1 wherein said crush box includes a wall lying in a generally horizontal plane, said wall aligned with at least a portion of said gusset.

3. The construction as defined in claim 2 wherein said second end of said gusset is generally U-shaped having a pair of side walls and a base wall, said wall of said crush box being aligned with said side walls of said gusset.

4. The construction as defined in claim 1 wherein said pillar is constructed of sheet metal having a first thickness and said crush box is constructed of sheet metal having a second thickness, said second thickness being greater than said first thickness.

5. The construction as defined in claim 1 wherein said crush box comprises five at least partially closed sides and one open side, said open side facing said gusset.

6. The construction as defined in claim 5 wherein said crush box is welded to said pillar.

7. The construction as defined in claim 1 and comprising a reinforcing plate secured to said gusset.

8. The construction as defined in claim 7 wherein said reinforcing plate extends along said gusset from a position closely adjacent said pillar and to a position spaced from said cross member.

9. The construction as defined in claim 1 wherein said crush box is dimensioned to provide a constant force times deformation upon a side impact on said pillar.

* * * * *